United States Patent [19]

Dickinson

[11] Patent Number: 5,004,706
[45] Date of Patent: Apr. 2, 1991

[54] PRODUCING MOLTEN GLASS AND BATCH COMPONENTS THEREFOR

[75] Inventor: Clive F. Dickinson, Lancashire, England

[73] Assignee: Pilkington plc, Merseyside, England

[21] Appl. No.: 280,815

[22] Filed: Dec. 7, 1988

[30] Foreign Application Priority Data

Dec. 10, 1987 [GB] United Kingdom ............... 8728892

[51] Int. Cl.$^5$ ............................................. C03C 6/00
[52] U.S. Cl. ..................................... 501/27; 501/28; 501/31; 65/135
[58] Field of Search ............... 501/27, 28, 31; 65/134, 65/135, 136

[56] References Cited

U.S. PATENT DOCUMENTS 4,142,907  3/1979  Manring ..................... 106/52

FOREIGN PATENT DOCUMENTS 1211098  3/1960  France .
141015   4/1980  German Democratic Rep. .

OTHER PUBLICATIONS

Chemical Abstracts, vol. 75, 1971, p. 650, 58112C.
Chemical Abstracts, vol. 92, 1980, p. 271, 46328R.

Primary Examiner—William R. Dixon, Jr.
Assistant Examiner—Chris Gallo
Attorney, Agent, or Firm—Burns, Doane, Swecker & Mathis

[57] ABSTRACT

A method of producing molten glass wherein silica is heated with a batch component comprising a sodium alkaline earth silicate which includes a major portion of the sodium in the resultant molten glass. There is also disclosed a batch component for use in glass manufacture, comprising sodium calcium silicate, and, optionally, sodium magnesium silicate. There is further disclosed a method of producing a batch component comprising sodium calcium silicate for use in glass manufacture, the method comprising heating a mixture of (i) a source of sodium oxide and (ii) (a) a source of calcium silicate or (b) a source of calcium oxide and a source of silica, at a temperature of greater than about 800° C.

19 Claims, 1 Drawing Sheet

NCS  = Sodium Calcium Silicate
NC$_2$S$_3$ = Sodium Dicalcium Trisilicate
βCS  = Beta Wollastonite
S    = Silica NCS = Sodium Calcium Silicate
NC₂S₃ = Sodium Dicalcium Trisilicate
βCS = Beta Wollastonite
S = Silica

PRODUCING MOLTEN GLASS AND BATCH COMPONENTS THEREFOR

BACKGROUND TO THE INVENTION

The present invention relates to a method of producing molten glass, to batch components for use in glass manufacture, and to a method of producing such batch components.

In the manufacture of glass, it is known to introduce a cold powdered mixture of raw materials, these being referred to in the art as cold batch, into a tank of molten glass and to react and melt the batch. This method is employed in the production of flat glass by the float process. A large tank is used for that process. It has been realised for some time that the present methods of melting glass are not particularly thermally efficient.

It is known to pre-heat the batch, for example by the use of exhaust gas from the burners which are used to heat the main melting tank. This gives some improvement in thermal efficiency, but it has been found that there are limitations to the degree to which the batch can be preheated. One such limitation is that some of the components form liquids at comparatively low temperatures and this causes the batch to become sticky and to block up the heat exchanger. It is well known that the first glassy phase to be formed in float glass batches is the product of a reaction of soda ash and some of the sand. It has been found that such batches become sticky at about 600° C.

Proposals have been made to pre-react selected batch components. Russian Patent No. 716986 in the name of Kalinin Polytechnical Institute describes complex reaction schemes involving several reaction vessels and careful control of temperature and pressure.

These reaction schemes take no account of the materials handling problems that are associated with the use of naturally occurring raw materials: e.g. sticking, due to low melting point substances being formed on heating.

SUMMARY OF THE INVENTION

The present invention provides a method of producing molten glass wherein silica is heated with a batch component comprising a sodium alkaline earth silicate which includes a major portion of the sodium in the resultant molten glass.

At least one of the batch component and the silica may be preheated to a temperature greater than the liquidus of the resultant molten glass before the starting material and silica are combined.

In a preferred embodiment, the batch component comprises sodium calcium silicate ($Na_2O.CaO.SiO_2$).

In a particularly preferred embodiment, the batch component further comprises sodium magnesium silicate ($Na_2O.MgO.SiO_2$).

The batch component may still further comprise at least one of magnesite, magnesia, soda ash, sodium silicate, lime and sodium sulphate.

The present invention further provides sodium calcium silicate ($Na_2O.CaO.SiO_2$). This compound can be used as a batch component in glass manufacture, and, optionally, in admixture with other batch component materials which contain glass modifiers, such as magnesite, magnesia, soda ash, sodium silicate, lime and sodium sulphate.

The present invention still further provides a batch component for use in glass manufacture, comprising sodium calcium silicate ($Na_2O.CaO.SiO_2$) and sodium magnesium silicate ($Na_2O.MgO.SiO_2$). The batch component may further comprise magnesia (MgO) and optionally, the batch component may be in admixture with raw materials which contain glass modifiers, such as sodium sulphate, magnesite, lime, sodium silicate and soda ash.

The present invention still further provides a method of producing a sodium calcium silicate batch component for use in glass manufacture, the method comprising heating a mixture of a source of calcium silicate ($CaO.SiO_2$) and a source of sodium oxide at a temperature of greater than about 800° C. The source of calcium silicate may be wollastonite or calumite. The source of sodium oxide may be soda ash or sodium hydroxide.

The wollastonite may be produced by reacting a source of calcium oxide with a source of silica at a temperature of from 1000 to 1300° C. The source of calcium oxide may be lime, limestone or calcium hydroxide and the source of silica may be sand.

Alternatively sodium calcium silicate may be produced by heating a mixture of a source of calcium oxide, a source of silica and a source of sodium oxide at a temperature of greater than about 800° C. The source of sodium oxide may be of soda ash. The source of silica may be sand.

The source of calcium oxide may be produced by calcination of limestone.

In a preferred embodiment, the batch component comprises sodium calcium silicate and sodium magnesium silicate and the mixture which is heated further comprises a source of magnesium silicate ($MgO.SiO_2$). The source of magnesium silicate may be diopside, enstatite or akermanite. Diopside and akermanite also act as a source of calcium silicate.

The mixture of a source of calcium silicate and a source of magnesium silicate may be produced by heating a source of calcium oxide, a source of magnesium oxide and a source of silica at a temperature of from 1000 to 1300° C.

The source of silica may be sand. The source of calcium oxide may be lime, limestone or calcium hydroxide. The source of magnesium oxide may be magnesia, magnesite or dolomite, the dolomite also comprising a source of calcium oxide.

In a further alternative embodiment, diopside provides a portion of the source of calcium silicate and the source of magnesium silicate.

Alternatively sodium calcium silicate and sodium magnesium silicate may be produced by heating a mixture of calcium oxide, a source of silica, a source of sodium oxide and a source of magnesium oxide at a temperature of greater than about 800° C. The source of sodium oxide may be soda ash or sodium hydroxide. The source of silica may be sand. The source of calcium oxide may be produced by calcination of limestone. The source of magnesium oxide may be magnesia, magnesite or dolomite.

The present invention also provides a method of producing molten glass wherein a batch component having a melting point higher than the liquidus temperature of the molten glass is first produced from naturally occuring sources of sodium oxide, calcium oxide, silica and optionally magnesium oxide, and then the batch component, which may further comprise glass modifying batch component materials, is heated with a silica batch component to form the molten glass.

BRIEF DESCRIPTION OF THE DRAWINGS

The present invention will now be described by way of example only with reference to the accompanying drawing, in which.

DETAILED DESCRIPTION OF THE PREFERRED EMBODIMENTS

Figure 1:
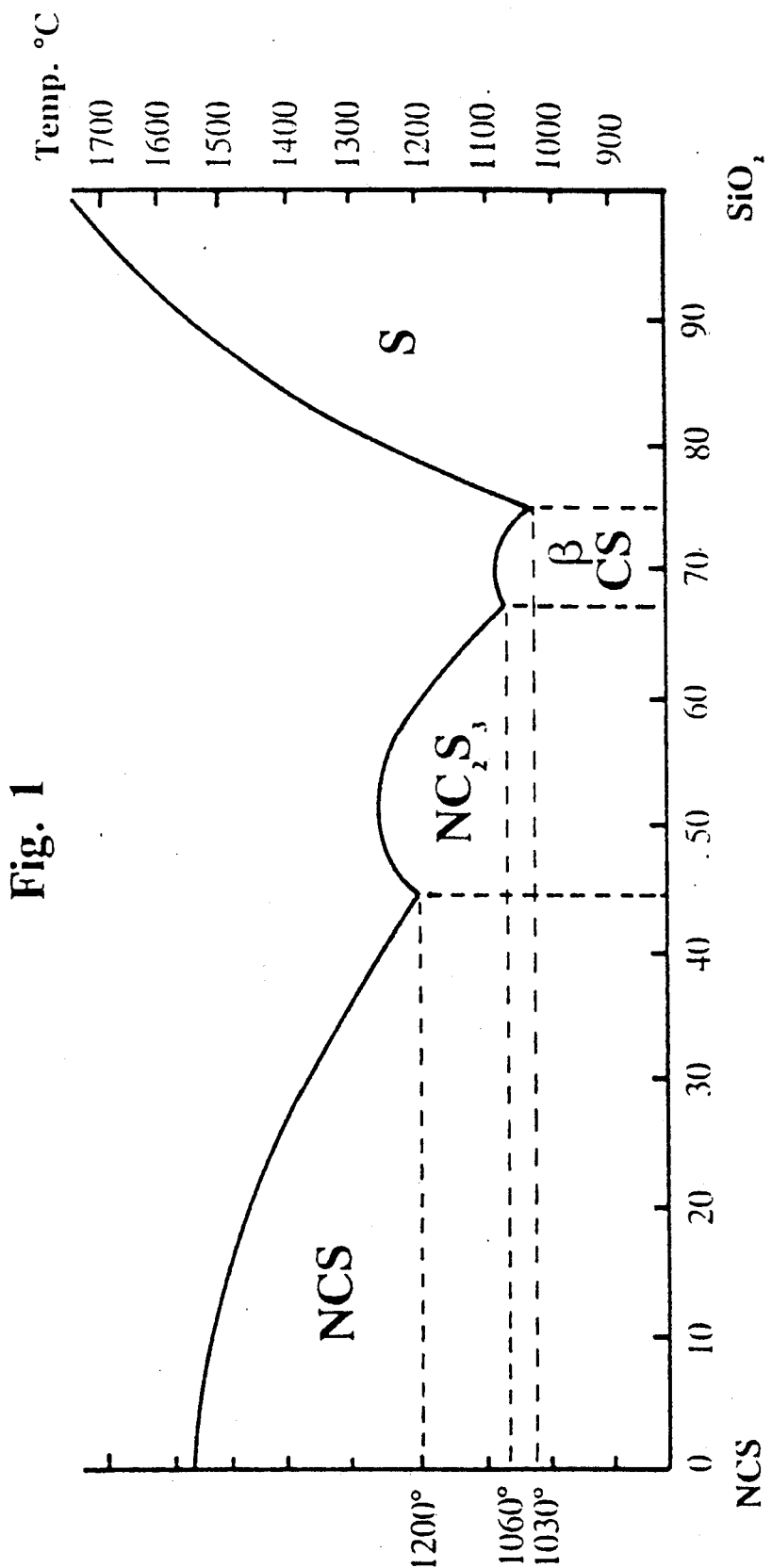
FIG. 1 is a phase diagram of the sodium calcium silicate (NCS)-SiO$_2$ system.

An attempt was made to form silicates from a mixture, in the same proportions as in a typical window glass batch, of soda ash (Na$_2$CO$_3$) and calcium silicate (i.e. wollastonite) (CaO.SiO$_2$). The soda ash reacted with the calcium silicate to produce a solid compound which considering the soda content had a surprisingly high melting point of greater than 1500° C.

The solid compound was analysed by x-ray diffraction. This analysis identified the material as sodium calcium silicate (Na$_2$CaSiO$_4$), hereinafter referred to as NCS (employing the notation N = Na$_2$O, CaO and S = SiO$_2$). NCS has a 1:1:1 molar ratio of Na$_2$O, CaO and SiO2. The melting point of NCS was determined to be 1550° C.

A series of experiments was then carried out to produce NCS.

The reaction to produce NCS may be considered to be of the following general form:

$$X + Y \rightarrow NCS$$

where X and Y are respective first and second solid reactants. X contains sodium and can be soda ash (Na$_2$CO$_3$), or any other source of Na$_2$O, such as NaOH. Y contains calcium and silica, and it is preferable that a large proportion of the silica is in the form of silicate. Y can comprise wollastonite (CaSiO$_3$), blast furnace slag and silica in admixture, or any other material or combination of materials containing calcium and silicate in the required proportions.

It was found that NCS could be reliably manufactured by heating a 1:1 molar ratio mixture of wollastonite and soda ash at 1000° C. X-ray diffraction analysis was used to confirm the presence of NCS and the absense of other silicates.

For the manufacture of NCS from wollastonite and soda ash, the chemical reaction is:

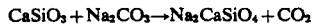

CaSiO$_3$ + Na$_2$CO$_3$ → Na$_2$CaSiO$_4$ + CO$_2$

It was found that the reaction started at 700° C., which is before the soda ash has melted. The reaction was quicker when the soda ash was molten, i.e. at a temperature of at least 850° C. It was found that the mixture of calcium silicate and soda ash was completely reacted at 1000° C. after one and a half hours to produce NCS which by X-ray diffraction analysis showed only traces of sodium carbonate remaining.

The wollastonite can be manufactured by heating limestone with silica at a temperature typically of from 1000-1300° C., the reaction being:

CaCO$_3$ + SiO$_2$ → CaO.SiO$_2$ + CO$_2$

As an alternative to limestone, other CaO sources, e.g. calcium hydroxide, may be used and as an alternative to silica, silica sources, e.g. silica sand, can be used. Once the calcium silicate has been formed, this is reacted with a source of Na$_2$O to form NCS, such as in the following reaction, which is carried out at a temperature of greater than 800° C.:

CaO.SiO$_2$ + Na$_2$CO$_3$ ⟶ NaO.CaO.SiO$_2$ + CO$_2$
                                                          NCS

The reaction of wollastonite and soda ash can also result in the production of small quantities of other silicates, such as (using the notation referred to hereinabove) NCS$_3$, N$_2$CS$_3$ and NC$_2$S$_3$, although NCS is the major silicate component in the product.

Accordingly, NCS can be manufactured from raw materials conventionally utilised in glass manufacture and particularly raw materials used for manufacture of float glass.

The reactions described above are based on stoichiometric mixtures of the oxides. However, in practice, it may not always be possible to maintain stoichiometry because of the ratios of the oxides used in the resultant glass composition. For the reaction to form wollastonite and the reaction to form NCS it is permissible to have an excess of CaO. It is also permissible to have a small excess of soda ash for the reaction to form NCS; a large excess of soda ash may lead to sintering of the hot product. In both of the reactions, an excess of SiO$_2$ is to be avoided so as to prevent the formation of sodium silicate as this hinders the production of NCS.

Tests were also done using blast furnace slag as the source of CaO and SiO$_2$, mixed with sodium carbonate and extra silica. After 30 minutes at 1200° C., the mixture had converted to a sintered mass containing mainly NCS.

It was found that attempts to manufacture NCS by other routes such as by heating a 1:1:1 molar mixture of limestone, sand and soda ash, failed to produce the material in significant quantities. In some instances no NCS at all was detected by X-ray diffraction analysis. However, when we repeated this using calcined limestone as a source of lime instead of the limestone we found that a significant quantity of NCS was formed, presumably because of the higher reactivity of the calcined limestone.

In many soda-lime-silica glass compositions, e.g. for float glass compositions, there is a need for magnesium to be introduced into the glass batch. When NCS is used, the magnesium may be incorporated into the batch by adding dolomite to the batch. However, the present inventor has also discovered that when magnesium is required in the glass batch, it can advantageously be added in the form of a sodium-magnesium-containing compound which together with NCS is added to the batch.

In his experiments the present inventor used diopside (calcium magnesium silicate) as part of a float batch. The diopside reacted with soda ash in the batch at a temperature of 1450° C. The product was analysed by X-ray diffraction which showed that the product was a mixture of NCS and a material analagous to NCS, namely sodium magnesium silicate (Na$_2$O. MgO. SiO$_2$), hereinafter referred to as NMS (using the notation referred to hereinabove and wherein M = MgO). The reaction of diopside with soda ash may be represented as follows:

CaMgSi$_2$O$_6$ + 2Na$_2$CO$_3$ $\xrightarrow{\text{Soda ash}}$ Na$_2$CaSiO$_4$ +
Diopside                                              NCS $$Na_2MgSiO_4 + 2CO_2$$
$$NMS$$

Generally, a mixture of NCS and NMS may be produced by reacting with a source of $Na_2O$, such as soda ash or NaOH, calcium and magnesium silicates, either in individual form or as mixed Ca/Mg silicates (e.g. diopside) or calcium and magnesium silicate-containing materials.

For example, a mixture of NCS and NMS can also be produced by the reaction of a mixture of wollastonite ($CaO.SiO_2$) and enstatite ($MgO.SiO_2$) with soda ash at a temperature greater than 800° C. The mixture of wollastonite and enstatite is produced by the reaction of a mixture of limestone and dolomite with sand at a temperature of from 1000° to 1300° C. The mixture of wollastonite and enstatite may further include or be substituted by akermanite ($2CaO.MgO.2SiO_2$) which can be produced by heating a mixture of $CaO, MgO$ and $SiO_2$. The reaction products which result from heating $CaO, MgO$ and $SiO_2$ can vary with different reaction conditions and starting materials.

Mixtures of NSC and NMS can also be formed by reacting together mixtures of calcined dolomite, sand and soda ash. The ratio of NCS to NMS can be varied by adding calcined limestone to the mixture.

For the reasons stated above in relation to the production of NCS, it is permissible to have an excess of CaO and MgO and a small excess of $Na_2CO_3$. In practice, the amounts of limestone and dolomite are controlled so as to give the required CaO/MgO ratio in the final glass composition. The amount of sand which is reacted with the limestone/dolomite mixture is calculated to be such that the $SiO_2$ is preferably in 1:1 molar ratio with the $Na_2O$ from the soda source which is added later.

This means that for window glass compositions the incorporation of MgO into the composition can be achieved by employing NMS in addition to NCS. These materials can be made by using dolomite. Accordingly, when NCS and NMS are used as intermediate compounds, normal glass making raw materials can be used as starting materials for glass batches and no new raw materials, in particular for an MgO source, are required. Mixtures of NCS and NMS can also be used for other glass compositions containing magnesium.

It is probable that even with the preferred reaction route, small quantities of other silicates may be formed. Consequently, the actual analysis of the prepared compound may also show small quantities of unreacted CaO. Other sources of CaO e.g. $Ca(OH)_2$; of MgO eg $MgCO_3$; of silica and silicates, may be used for the reaction to form the mixture of wollastonite and enstatite or akermanite. NaOH may be used to replace soda ash in the reaction to form NCS and NMS.

Some of the reaction paths indicated above were employed to produce glass compositions which correspond to those which are used for commercial glass manufacture. The glass compositions were produced in the following Examples which illustrate the present invention in greater detail.

EXAMPLE 1

239.65g of wollastonite were heated to 1000° C. with 218.33g of soda ash. The resulting reaction product, containing mainly NCS, was mixed with 622.23g of sand, 5g of magnesium oxide and 8.9g of saltcake ($Na_2SO_4$). The batch was melted in a furnace to give a glass of the following composition

| $SiO_2$ | 73.0 wt % |
|---|---|
| $Al_2O_3$ | 1.4 wt % |
| $Fe_2O_3$ | 0.07 wt % |
| MgO | 0.5 wt % |
| CaO | 11.0 wt % |
| $Na_2O$ | 13.2 wt % |
| $K_2O$ | 0.5 wt % |
| $SO_3$ | 0.3 wt % |

EXAMPLE 2

246.19g dolomite, 18.46g limestone and 127.27g sand were mixed and heated to 1200° C. for 2 hours. The resulting products were then mixed with 218.02g soda ash and held at 1000° C. for 1 hour. The reaction products, containing NCS and NMS, were then mixed with 601.5g sand and 8.9g saltcake. The batch was melted in a furnace at 1480° C. giving a clear glass of the following composition

| $SiO_2$ | 71.3 wt % |
|---|---|
| $Al_2O_3$ | 0.8 wt % |
| $Fe_2O_3$ | 0.1 wt % |
| MgO | 5.2 wt % |
| CaO | 8.6 wt % |
| $Na_2O$ | 13.2 wt % |
| $K_2O$ | 0.5 wt % |
| $SO_3$ | 0.3 wt % |

EXAMPLE 3

117.92g dolomite and 129.98g limestone were mixed with 61.4g sand and heated to 1200° C. for 2 hrs. The products were then mixed with 216.48g of soda ash and heated to 1000° C. for 1 hr. The reaction products, containing NCS and NMS, were then mixed with 614.5g sand and 8.9g saltcake. The batch was then melted to yield a glass of the following composition

| $SiO_2$ | 72.3 wt % |
|---|---|
| $Al_2O_3$ | 1.0 wt % |
| $Fe_2O_3$ | 0.1 wt % |
| CaO | 10.7 wt % |
| MgO | 2.1 wt % |
| $Na_2O$ | 13.1 wt % |
| $K_2O$ | 0.5 wt % |
| $SO_3$ | 0.2 wt % |

EXAMPLE 4

321.2g calcined limestone, 343.7g sand and 597.5g soda ash were mixed and reacted together at 900° C. The products, containing NCS, were then mixed with 68.1g soda ash, 645.0g sand, 39.5g magnesium oxide and 8.g saltcake. The batch was melted in a furnace to make a glass of the following composition

| $SiO_2$ | 72.5 wt % |
|---|---|
| $Al_2O_3$ | 1.1 wt % |
| $Fe_2O_3$ | 0.1 wt % |
| MgO | 4.0 wt % |
| CaO | 8.5 wt % |
| $Na_2O$ | 13.0 wt % |
| $K_2O$ | 0.5 wt % |
| $SO_3$ | 0.3 wt % |

In any of the above examples the source materials for CaO, MgO and $Na_2O$ may be any combination of those used in the examples or any other raw materials as appropriate eg NaOH for Na₂O, CaOH for CaO.

The foregoing provides an illustration of four typical glass compositions which may be made employing NCS (and NMS) as a starting material. However, it should be understood that NCS and NMS can be employed to manufacture glasses having compositions falling outside the ranges encompassed by the compositions specified. For example, the present invention may be employed to make soda-lime-silica glass compositions for glass fibre manufacture having up to 15 wt % soda and soda-lime-silica compositions for float glass having low lime, e.g. as low as 8.4 wt % lime. The four illustrative compositions are intended to exemplify flat and container glass composition ranges.

In accordance with the present invention, by employing NCS, and, optionally, NMS in combination with the NCS, in the glass batch, the reaction path which leads to the formation of the glass is altered when compared with known reaction paths. The majority of the sodium in the resultant glass composition is included within the sodium alkaline earth silicate of NCS or, if appropriate, the mixture of NCS and NMS. The result of this is that in the glass forming reaction, the remaining components of the glass batch including silica react with NCS (and NMS) at the end of the reaction path. In contrast, in the known glass forming reactions, the reaction of silica with soda ash occurs at the start of the reaction path and is followed by the incorporation of the other batch components.

In order to illustrate the reaction path resulting from the present invention, FIG. 1 shows a representation of the liquidus curve for mixtures of NCS and silica, and also indicates the solidus phases which can occur. For a mixture of NCS and $SiO_2$ the lowest liquidus temperature is 1030° C. In a typical float batch this liquidus temperature would be several degrees lower, e.g. about 1000° C., due to the presence of magnesium in the composition which has not been allowed for in FIG. 1. It is not possible to construct a liquidus curve for conventional batch melting since there are too may parallel reactions producing variable quantites of intermediate compounds. These will depend on local batch composition and temperature. Thus, the phase diagram of FIG. 1 indicates that the components of the mixture of NCS and $SiO_2$ in the proportions for a float glass batch will react together to form a liquid at about 1000° C. Accordingly, since NCS and $SiO_2$ individually have melting temperatures greater than 1000° C., (1550° C. for NCS and 1720° C. for sand), then the glass composition is the first liquid phase to be produced due to the reaction of NCS and $SiO_2$. Known batches begin to melt at 750° C. by the production of sodium silicates.

An advantage which results from the use of NCS in float batches is that each of the two batch components can be individually heated to temperatures greater than the melting point of the resultant glass since no liquid phases occur until the components themselves melt. The mixture of the two, in the proportions for float batch, will melt at about 1000° C. This enables either the full batch mixture to be preheated up to about 900° C. prior to feeding the furnace, or the individual batch components can be heated to even higher temperatures prior to mixing. If NCS is prepared using furnace gases as the heat source, the NCS can be available at a temperature in the region of 1000° C.

What I claim is:

1. A method of producing a molten glass wherein silica is heated with a batch component which provides the major portion of the sodium in the resultant molten glass and which comprises a crystalline sodium alkaline earth silicate, which has $Na_2O$, alkaline earth oxide, and $SiO_2$ components in a molar ratio of 1:1:1.

2. A method according to claim 1 wherein at least one of the batch component and the silica is preheated to a temperature greater than the liquidus of the resultant molten glass before the starting material and silica are combined.

3. A method according to claim 1 wherein the batch component comprises sodium calcium silicate.

4. A method according to claim 3 wherein the batch component further comprises sodium magnesium silicate.

5. A method according to claim 1 wherein the batch component further comprises at least one component selected from the group consisting of magnesite, magnesia, soda ash, sodium silicate, lime and sodium sulphate.

6. A batch component for use in glass manufacture, comprising crystalline sodium calcium silicate, which has $Na_2O$, CaO, and $SiO_2$ components in the molar ratio of 1:1:1, and which further comprises sodium magnesium silicate.

7. A batch component according to claim 6 further comprising magnesia.

8. A batch component according to claim 6 further comprising at least one component selected from the group consisting of magnesite, magnesia, soda ash, sodium silicate, lime and sodium sulphate.

9. A method of producing a batch component comprising crystalline sodium calcium silicate for use in glass manufacture, the method comprising heating a mixture of a first component (i) comprising a source of sodium oxide and a second component (ii) comprising a source of calcium silicate, the heating being carried our at a temperature of greater than about 800° C., and the sodium calcium silicate having $Na_2O$, CaO and $SiO_2$ components in a molar ratio on 1:1:1.

10. A method according to claim 9 wherein the source of calcium silicate is wollastonite which is produced by reacting a source of calcium oxide with a source of silica at a temperature of from 1000° to 1300° C.

11. A method according to claim 9 wherein the batch component further comprises sodium magnesium silicate and the mixture which is heated further comprises a source of magnesium silicate.

12. A method according to claim 11 wherein the source of magnesium silicate is at least one compound selected from the group consisting of diopside, enstatite and akermanite.

13. A method according to claim 12 wherein the diopside and akermanite also at least partially comprise the source of calcium silicate.

14. A method according to claim 10 wherein the batch component further comprises sodium magnesium silicate and the mixture which is heated further comprises a source of magnesium silicate.

15. A method according to claim 11 wherein the said component (ii) of the mixture which is heated comprises a source of calcium silicate and a source of magnesium silicate, and the said component (ii) is produced by heating a source of calcium oxide, a source of magnesium oxide and a source of silica at a temperature of from 1000° to 1300° C.

16. A method according to claim 15 wherein the source of magnesium oxide is at least the compound selected from the group consisting of magnesia, magnesite and dolomite, and wherein dolomite also at least partially comprises the source of calcium oxide.

17. A method according to claim 15 wherein diopside at least partially provides the source of calcium silicate and the source of magnesium silicate.

18. A method according to claim 9 wherein the batch component further comprises sodium magnesium silicate and the mixture which is heated comprises a source of sodium oxide, a source of calcium oxide, a source of silica and a source of magnesium oxide.

19. A method according to claim 18 wherein the source of magnesium oxide is selected from the group consisting of magnesia, magnesite and dolomite.

* * * * *